(12) United States Patent
Lin (10) Patent No.: US 11,347,863 B2
(45) Date of Patent: May 31, 2022

(54) COMPUTER APPARATUS AND AUTHORITY MANAGEMENT METHOD BASED ON TRUST CHAIN

(71) Applicant: Nuvoton Technology Corporation, Hsinchu (TW)

(72) Inventor: Zong-Min Lin, Kaoshiung (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 17/138,141

(22) Filed: Dec. 30, 2020

(65) Prior Publication Data

US 2021/0200876 A1 Jul. 1, 2021

(30) Foreign Application Priority Data

Dec. 31, 2019 (TW) .................................. 108148545

(51) Int. Cl.
*G06F 9/44* (2018.01)
*G06F 21/57* (2013.01)
*G06F 9/4401* (2018.01)

(52) U.S. Cl.
CPC .......... *G06F 21/575* (2013.01); *G06F 9/4401* (2013.01); *G06F 2221/033* (2013.01)

(58) Field of Classification Search
CPC . G06F 21/575; G06F 9/4401; G06F 2221/033
See application file for complete search history.

(56) References Cited

U.S. PATENT DOCUMENTS

| | | | | |
|---|---|---|---|---|
| 2006/0136705 A1* | 6/2006 | Kaimal | .................... | G06F 21/64 713/2 |
| 2007/0179907 A1* | 8/2007 | Waris | ..................... | G06F 21/575 705/76 |
| 2008/0086629 A1* | 4/2008 | Dellow | ................. | G06F 21/575 713/2 |
| 2009/0144559 A1* | 6/2009 | Lee | ........................ | G06F 21/575 713/189 |

(Continued)

FOREIGN PATENT DOCUMENTS

| | | |
|---|---|---|
| CN | 101167108 A | 4/2008 |
| CN | 104794393 A | 7/2015 |
| TW | 201610682 A | 3/2016 |

*Primary Examiner* — Zahid Choudhury
(74) *Attorney, Agent, or Firm* — Muncy, Geissler, Olds & Lowe, P.C.

(57) ABSTRACT

A computer apparatus is provided, which includes a plurality of peripheral apparatuses, a non-volatile memory, a processor, and an authority-control circuit. The memory unit stores a plurality of boot codes and setting values of a function set of the peripheral apparatuses corresponding to each boot code, wherein the boot codes form a chain of trust. In response to the execution of a current boot code being completed, the authority-control circuit sets the setting values of the functions in a second function set corresponding to a next boot code in the chain of trust, sends an authority-control signal to control the peripheral apparatuses corresponding to the second function set according to the setting values of the functions in the second function set, and sets a boot flag corresponding to the next boot code in the authority-control circuit to control the processor to execute the next boot code.

12 Claims, 8 Drawing Sheets

(56) References Cited

U.S. PATENT DOCUMENTS

| | | | |
|---|---|---|---|
| 2015/0052610 A1 | 2/2015 | Thom et al. | |
| 2015/0113258 A1* | 4/2015 | Grieco | G06F 21/572 |
| | | | 713/2 |
| 2015/0207624 A1* | 7/2015 | Laver | H04L 9/0866 |
| | | | 713/2 |
| 2018/0260568 A1* | 9/2018 | Cisneros | G06F 21/44 |
| 2020/0327233 A1* | 10/2020 | Pak | H04W 12/069 |
| 2021/0232337 A1* | 7/2021 | Talvitie | G06F 21/79 |

* cited by examiner

COMPUTER APPARATUS AND AUTHORITY MANAGEMENT METHOD BASED ON TRUST CHAIN

CROSS REFERENCE TO RELATED APPLICATIONS

This application claims the benefit of Taiwan Patent Application No. 108148545, filed on Dec. 31, 2019, in the Taiwan Intellectual Property Office, the disclosure of which is incorporated herein in its entirety by reference.

BACKGROUND OF THE INVENTION

Field of the Invention

The present invention relates to computer systems, and, in particular, to a computer apparatus and a method of authority management based on a chain of trust.

Description of the Related Art

In current computer systems, a secure boot with a chain of trust is widely used as the basis for a secure execution environment or a trusted execution environment. For example, a boot flow of secure boot with a chain of trust can achieve the function of a secure execution environment, thereby preventing unauthorized software from being executed during the boot process on the personal computer. It checks whether each software program section has a valid signature, including when the operating system is loaded. In addition, the process of starting and executing a system program is divided into multiple stages of boot code, and the function of each stage of the boot code is different, which may be provided by different developers.

The concept of the chain of trust is based on the mechanism of a trusted program, which means that the next-stage program to be executed will be authenticated first, and will only be executed after the authentication is passed. However, the mechanism of the chain of trust does not include authority management. Accordingly, when different boot codes are developed by different developers, there may be security concerns.

Therefore, there is demand for a computer apparatus and an authority-management method based on a chain of trust to solve the aforementioned problems.

BRIEF SUMMARY OF THE INVENTION

A detailed description is given in the following embodiments with reference to the accompanying drawings.

In an exemplary embodiment, a computer apparatus is provided. The computer apparatus includes: a plurality of peripheral apparatuses, a non-volatile memory, a processor, and an authority-control circuit. The peripheral apparatuses have a plurality of corresponding functions. The non-volatile memory is configured to store a plurality of boot codes and a plurality of setting values of a function set of the peripheral apparatuses corresponding to each boot code, wherein the boot codes form a chain of trust. The processor is configured to execute one of the boot codes in the chain of trust as a current boot code, wherein the current boot code corresponds to a first function set of the peripheral apparatuses. The authority-control circuit is electrically connected to the processor and the peripheral apparatuses, and is configured to read the setting values of the function set of the peripheral apparatuses corresponding to each boot code from the non-volatile memory. In response to execution of the current boot code being completed, the authority-control circuit sets the setting values of the functions in a second function set corresponding to a next boot code in the chain of trust, sends an authority-control signal to control the peripheral apparatuses corresponding to the second function set according to the setting values of the functions in the second function set, and sets a boot flag corresponding to the next boot code in the authority-control circuit to control the processor to execute the next boot code. The first function set is different from the second function set.

In some embodiments, when the setting values of the functions in the second function set corresponding to the next boot code are set and locked, the next boot code and its subsequent boot codes cannot modify the setting values of the functions in the second function set. When a first function among the functions does not have a default setting value, the processor sets the setting value of the first function before locking the setting value of the first function.

In some embodiments, the processor comprises a plurality of computing cores, and a host computing core of the computing cores sets the boot flag corresponding to the executed current boot code, and other computing cores of the computing cores are connected in series to the boot flag.

In some embodiments, when the processor switches to execute the next boot code from the current boot code, the authority-control circuit hides a storage region of the current boot code in the non-volatile memory, and hides a key that corresponds to the current boot code.

In some embodiments, when the authority-control circuit receives a reset signal of the computer apparatus, the authority-control circuit clears the boot flag and the setting values of each function corresponding to each boot code.

In another exemplary embodiment, an authority-management method based on a chain of trust for use in a computer apparatus is provided. The computer apparatus includes a plurality of peripheral apparatuses and an authority-control circuit. The method includes the following steps: executing one boot code in a plurality of boot codes in a chain of trust as a current boot code, wherein the current boot code corresponds to a first function set of the peripheral apparatuses; utilizing the authority-control circuit to read setting values of a function set of the peripheral apparatuses corresponding to each boot code from the non-volatile memory; and in response to execution of the current boot code being completed, utilizing the authority-control circuit to set the setting values of the functions in a second function set corresponding to the next boot code in the chain of trust, to send an authority-control signal to control the peripheral apparatuses corresponding to the second function set according to the setting values of the functions in the second function set, and to set a boot flag corresponding to the next boot code in the authority-control circuit to control the processor to execute the next boot code. The first function set is different from the second function set.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE INVENTION

The following description is made for the purpose of illustrating the general principles of the disclosure and should not be taken in a limiting sense. The scope of the disclosure is best determined by reference to the appended claims.

It should be understood that the words "comprising", "including" and the like used in this specification are used to indicate the existence of specific technical characteristics, numerical values, method steps, work processes, components and/or components, but not It does not exclude that you can add more technical features, values, method steps, job processing, components, components, or any combination of the above.

The terms such as "first", "second", and "third" are used in the claims to modify the elements in the claims, and are not used to indicate that there is a priority order, prior relationship, or is a component before another component, or the time sequence when performing method steps, only used to distinguish components with the same name.

Figure 1:
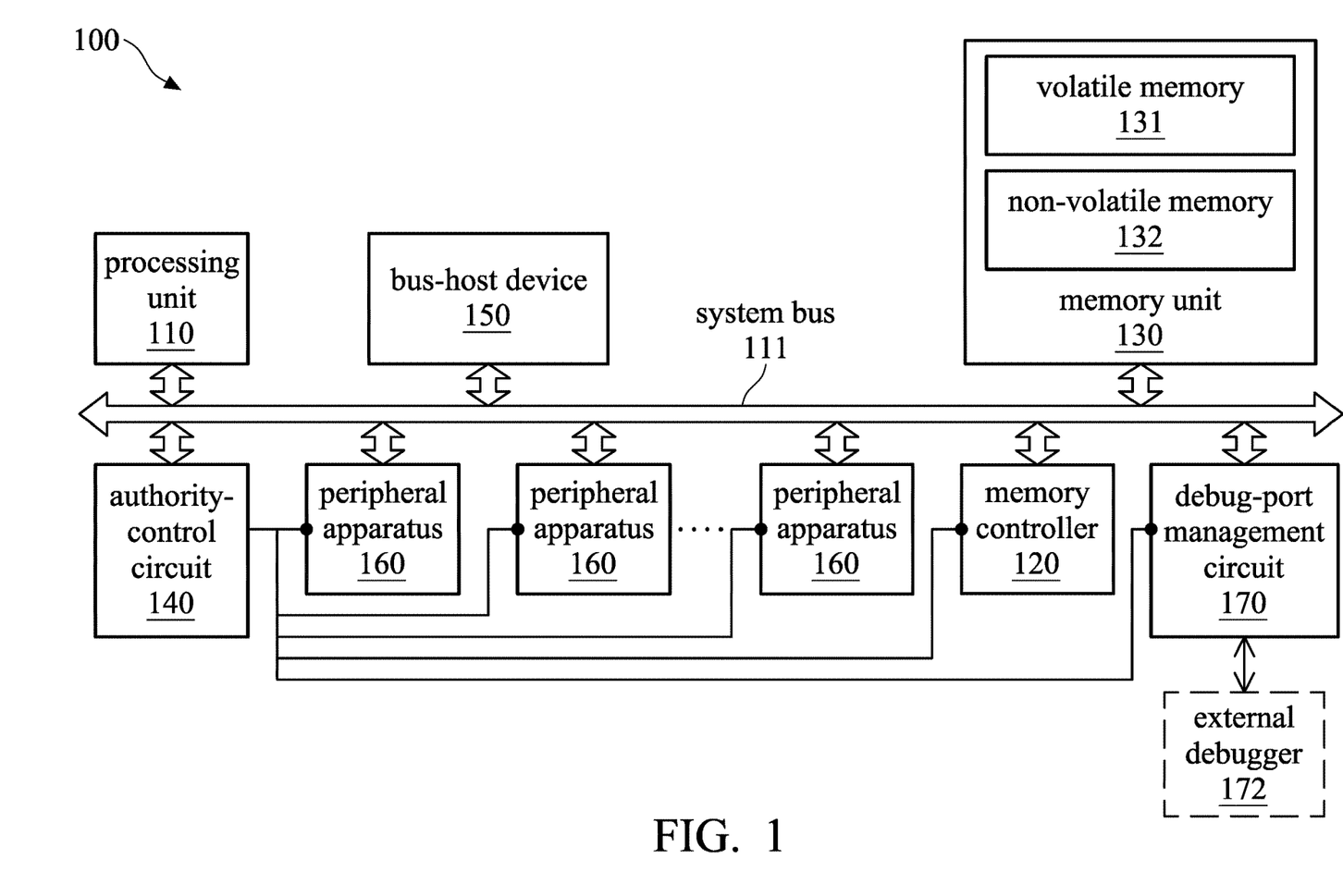
FIG. 1 is a block diagram of a computer apparatus in accordance with an embodiment of the invention.

FIG. 1 is a block diagram of a computer apparatus in accordance with an embodiment of the invention. The computer apparatus 100 may be, for example, a personal computer or a server. In an embodiment, the computer apparatus 100 may include a processing unit 110, a memory controller 120, a memory unit 130, an authority-control circuit 140, one or more bus-host devices 150, a plurality of peripheral apparatuses 160, and a debug-port management circuit 170. The processing unit 110, memory controller 120, memory unit 130, authority-control circuit 140, bus host devices 150, peripheral apparatuses 160, and debug-port management circuit 170 are electrically connected to each other via a system bus 111. In some embodiments, the system bus 111 may be, for example, an advanced high-performance bus (AHB), an advance system bus (ASB), an advanced peripheral bus (APB), or an advance extensible interface (AXI), but the invention is not limited thereto.

The processing unit 110 can be implemented in a variety of ways, such as a dedicated hardware circuit or a general-purpose hardware implementation (for example, a single processor, multiple processors with parallel processing capabilities or multiple processing cores, or other processors having computing capabilities), the foregoing implementation manner may be, for example, a general-purpose processor (general-purpose processor) or a central processing unit (CPU), but the present invention is not limited thereto.

The memory controller 120 is configured to control data access of the memory unit 130. The memory unit 130 may include a volatile memory 131 and a non-volatile memory 132, wherein the volatile memory 131 may be a static random access memory (SRAM) or a dynamic random access memory (DRAM), but the invention is not limited thereto. The non-volatile memory 132 may be a hard disk drive, a solid-state disk, a flash memory, a read-only memory, an erasable programmable read-only memory (EPROM), an electrically erasable programmable read-only memory (EEPROM), or an e-fuse, but the invention is not limited thereto. The non-volatile memory 132 is configured to store an operating system, a plurality of boot codes, and a plurality of setting values of different function sets managed by authority-control logic 141. In some embodiment, the computer apparatus 100 may include a plurality of non-volatile memories (e.g., may include the non-volatile memory 132) that are electrically connected to the system bus 111, and the boot codes and setting values of different function sets can be separately stored in different non-volatile memories. It should be noted that the invention is not limited to the storage manner of the boot codes and setting values of different function sets in one or more non-volatile memories.

In the embodiment, the memory controller 120 may include a memory-partitioning function that is capable of dividing the non-volatile memory 132 (e.g., a read-only memory) into a plurality of blocks, and each block may have its own specific attributes. The partitioning method of each block may be, for example, a fixed size, a start address and end address, a start address and block size, or hard pre-defined partitions. For example, if the partitioning method if a fixed size, each block has a fixed size (e.g., 4 KB), For example, address 0x0 to 0x0FFFF in the computer apparatus 100 is a block, and address 0x1000 to 0x1FFF is another block, and so on, where attributes of each block can be set individually. If the partitioning method is the start address and the end address, each a start address and an end address can be specified for a block. For example, a start address of 0x1000 and an end address of 0x2000 can be specified for a specific block, and the specific block occupies the space of the address range 0x1000 to 0x1FFF (i.e., a number of 0x2000 minus 1).

If the partitioning method is the start address and block size, a start address, block size, and attributes of each block can be specified. For example, if the start address is 0x1000 and the block size is 0x2000 for a specific block, the specific block occupies the space of the address range of 0x1000 to 0x1FFFF (e.g., a number of 0x2000 minus 1). If the partitioning method is a hardware pre-defined partition, the hardware circuit (e.g., the authority-control circuit 140) can directly assign multiple address ranges in the non-volatile memory 132 to different boot codes. For example, the address range of 0x2_0000 to 0x_FFFF corresponds to the block dedicated to the boot code BL0, and the address range of 0x3_0000 to 0x3_FFFF corresponds to the block dedicated to the boot code BL1, and so on.

The bus-host device 150 may have, for example, the ability to control access to the memory unit 130 or can control other peripheral apparatuses 160. The peripheral apparatuses 160 may include: serial communication equipment (e.g., supporting UART, SPI, I2C, USB protocols, etc.), watchdog circuits, a real-time clock, a clock controller, a power-management unit, a GPIO (general-purpose I/O) control unit, key-management unit, built-in self-test logic, etc., but the invention is not limited thereto. In addition, the debug-port management unit 170 also belongs to one of the peripheral apparatuses 160.

Specifically, each peripheral apparatus 160 is equipped with some functions that need to be controlled by authority. For example, in order to provide trusted time, the real-time clock may implement a monotonic function, which means the value of the clock can only be increased (i.e., counting up), and cannot be decreased (i.e., counting down). Through the authority-control circuit 140, the program executed by the processing unit 110 can be limited from being unable to count down the real-time clock value after a certain booting stage. The clock controller may provide a clock signal to each device in the system, and the activation of the clock signal can be limited by setting a boot flag, and the adjustment of the clock signal can only be set during a specific booting stage. The power-management unit may control the power switches and voltage adjustment in the system. In a system having a multi-voltage domain, the power-management unit can individually control the voltage switches in some regions. Combined with the authority management in the booting stage, the authority for limiting these switches can be limited. The debug-port management unit 170 may include a debug port that is connected to an external debugger 172, which can access system resources and maintain a path for debugging the system. The debug-port management unit 170 can control the authority of the external debugger 172 to access the system by controlling the debug port, and the debug-port management unit 170 can limit the authority of the debug port at each booting stage by setting a boot flag.

The key-management unit can distinguish the stored keys into keys used by the software at different stages in the booting process. The key-management unit may include the following design, such as the key can only be accessed during the corresponding booting stage of the software. For example, if the key is set to correspond to the boot code BL2, the key-management unit will only activate access of the key only when the software is running at the stage of the boot code BL2. Alternatively, the key can only be accessed before the software is in the corresponding booting stage (i.e., including the current booting stage). For example, if the key corresponds to the boot code BL2, the key-management unit will allow access to the key when the software is running the boot codes BL0, BL1 and BL2. Thereafter, the key-management unit will deny access to this key. The BIST logic can provide the computer apparatus to automatically test whether the circuits are normal. By setting the booting flag, the timing for activating the BIST can be limited.

Figure 2A:
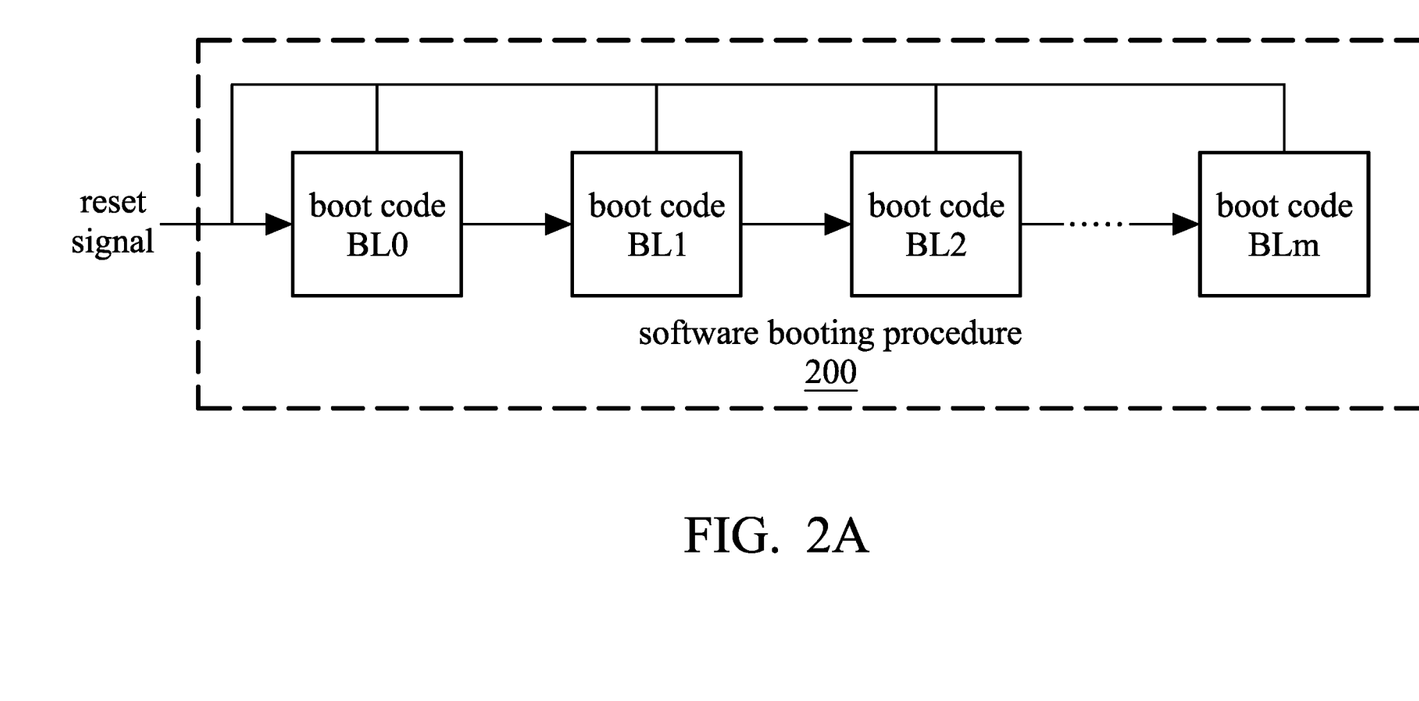
FIGS. 2A and 2B are portions of a diagram of a software booting procedure in accordance with different embodiments of the invention.
Figure 2B:
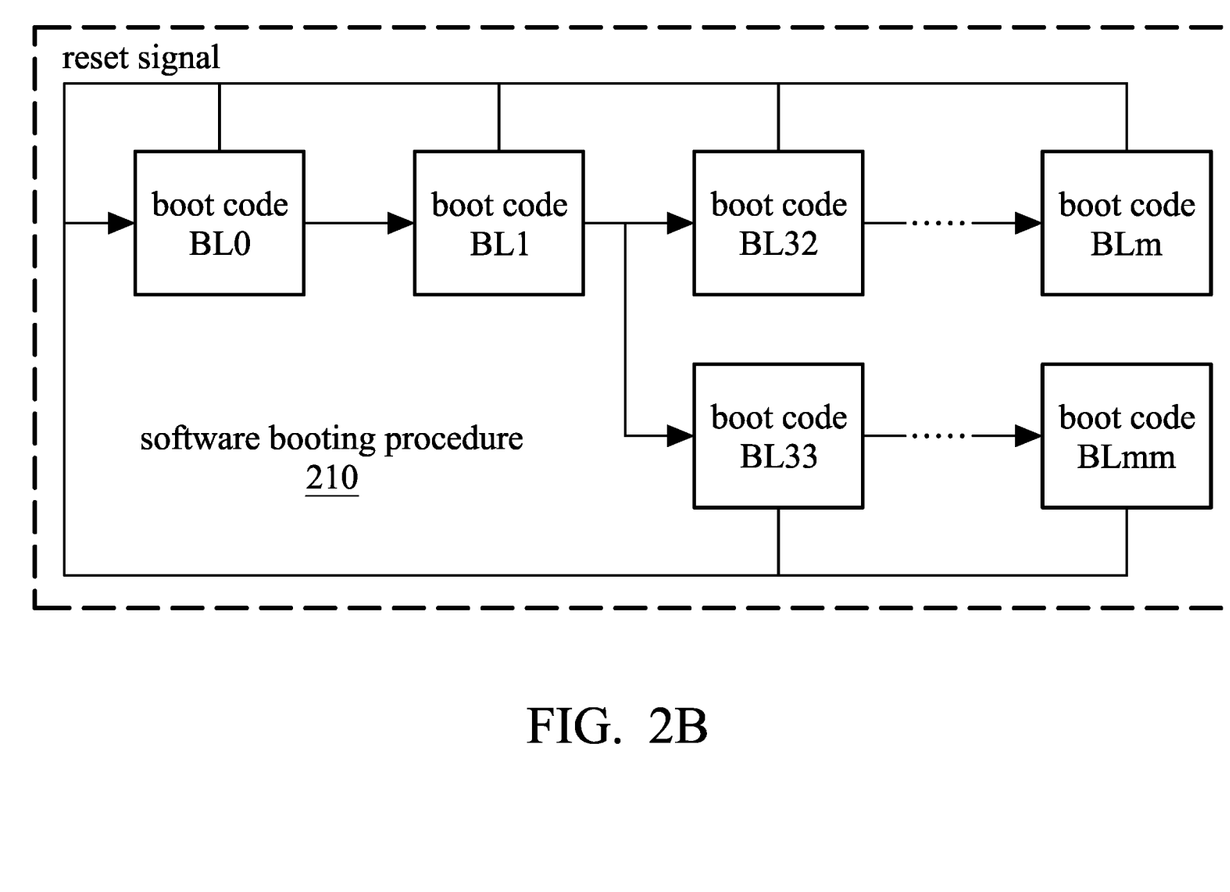

FIGS. 2A and 2B are portions of a diagram of a software booting procedure in accordance with different embodiments of the invention. As shown in FIG. 2A, after the computer apparatus 100 using a chain of trust is reset or powered on, the software booting procedure 200 will be performed based on the hardware design to ensure that the processing unit 110 must first execute the boot code BL0 (e.g., regarded as the initial boot code or the first boot code), wherein the boot code BL0 is, for example, an immutable non-volatile code, and is stored in a specific address range of the non-volatile memory 132.

When the processing unit 110 start to execute the boot code BL0 and completes the tasks of the boot code BL0, the processing unit 110 will determine whether the boot code BL1 exists. If the boot code BL1 exists, the processing unit 110 may verify the boot code BL1. After the verification is passed, the processing unit 110 will switch to the boot code BL1 and execute it. After completing the tasks of the boot code BL1, the processing unit 110 will determine whether the boot code BL2 exists and verify the boot code BL2 when it exists, and so on. Accordingly, a chain of trust can be obtained using the aforementioned procedure, as shown in FIG. 2A.

For example, the boot code BL0 may perform, for example, the following operations: searching for whether the boot code BL1 exists in the memory space, verifying the integrity of the boot code BL1, and verifying the authenticity of the boot code BL1 (i.e., ensuring that the boot code BL1 is provided by a specific legal develop). After the boot code BL0 is executed, the setting value and lock value of the function set corresponding to the boot code BL1 will be set before the software jumps off the boot code BL0. The boot flag BF1 will be set after the setting value and lock value of the function set corresponding to the boot code BL1 is set, and then the boot code BL1 is executed. After setting the boot flag BF1 corresponding to the boot code BL1, the processing unit 110 will consider that the software is executing the boot code BL1 at this time, and all peripheral apparatuses 160 of the computer apparatus 100 have only the authority corresponding to the boot code BL1. After the computer apparatus 100 is reset, the processing unit (or the authority-control circuit 140) will clear all boot flags in the authority-control circuit 140 according to the reset signal, and it indicates that the software booting procedure has been reset. Then, the processing unit 110 will start to execute the pre-defined boot code BL0 to ensure that the software booting procedure will follow the chain of trust. For example, the reset signal may be a POR (power on reset) signal when the computer apparatus 100 is powered on again.

In another embodiment, the chain of trust in the software booting procedure 210 of the computer apparatus 100 branches, as shown in FIG. 2B. For example, after executing the boot code BL2, the processing unit 110 may execute the boot code BL32 or BL33, and the authorities of the boot codes BL32 and BL33 may be different. The authority-control circuit 140 may control activation of the functions corresponding to each boot code through different boot flags. Similarly, after the computer apparatus 100 is reset, the processing unit will clear all boot flags in the authority-control circuit 140 according to the reset signal, and it indicates that the software booting procedure has been reset. Then, the processing unit 110 will start to execute the pre-defined boot code BL0 to ensure that the software booting procedure will follow the chain of trust.

Figure 3:
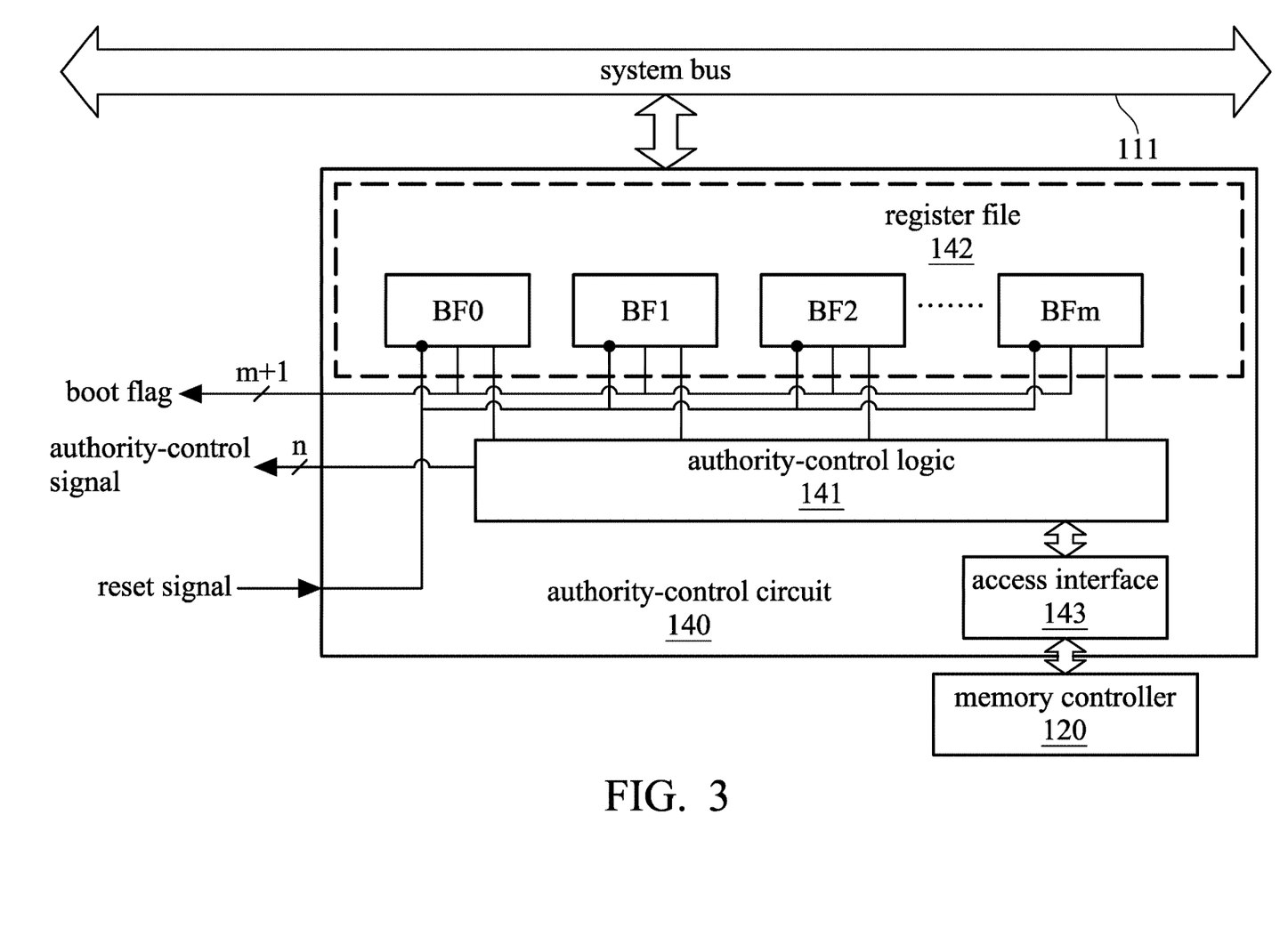
FIG. 3 is a diagram of the authority-control circuit in accordance with an embodiment of the invention.

FIG. 3 is a diagram of the authority-control circuit in accordance with an embodiment of the invention.

As depicted in FIG. 3, the authority-control circuit 140 may include authority-control logic 141, a register file 142, and an access interface 143. The authority-control circuit 140 may further include a bus interface (not shown), and can be electrically connected to other components in the computer apparatus 100 through the system bus 111, and the software executed by the processing unit 110 can access the value of each boot flag in the register file 142. The authority-control logic 141, for example, may have the ability to access the non-volatile memory 132, which reads the authority-control value stored in the non-volatile memory 132 through the access interface 143 (e.g., a non-volatile memory access interface), and provide the function of writing the setting values.

The authority-control logic is electrically connected to each peripheral apparatus 160 and the debug-port management circuit 170, and can send an authority-control signal to each peripheral apparatus 160 and the debug-port management circuit 170 to control activation/deactivation of the corresponding functions. The register file 142 may record a plurality of boot flags such as boot flags BF0 to BF(N−1), wherein each boot flag corresponding to a boot code such as boot codes BL0 to BL(N−1). The software executed by the processing unit 110 can set one of the boot flags to indicate the status of the software boot procedure, and the authority-control logic 141 can control the authority of each function and peripheral apparatus 160 in the computer apparatus 100 using the boot flags.

In the embodiment, the authority-control circuit 140 can receive the reset signal in the computer apparatus 100 to clear all the boot flags stored in the register file 142, which means that the software booting procedure is reset, and all boot flags and the authority-control logic 141 will return to the default state. Then, the processing unit 110 will execute from the pre-defined boot code BL0 to ensure that the software booting procedure will follow the chain of trust.

Referring to FIG. 3 and FIG. 2B, each boot flag stored in the register file 142 of the authority-control circuit 140 may include one or more bits, that can be used to represent a "configured" state or a "not configured" state. The software executed by the processing unit 110 is capable of setting each boot flag in the register file 142 to the "configured" state, but is not capable of setting to each boot flag to the "not configured" state. In addition, each boot flag can only be cleared by the reset signal in the computer apparatus 100 to return to the "not configured" state.

In the embodiment, the write permission of each boot flag is also managed by the authority-control logic 141. When the boot flag BF1 is 1, the write permission of the boot flag BF2 is activated by the authority-control logic 141. Accordingly, the booting state corresponding to the boot flag BF2 will be subsequent to that corresponding to the boot flag BF1. For example, if the booting states of the boot codes BL1 and BL2 are respectively represented by the boot flags BF1 and BF2, when the booting state is executing the boot code BL2, it indicates that the corresponding authority of the boot code BL2 has been correctly set by the boot code BL1.

Figure 4A:
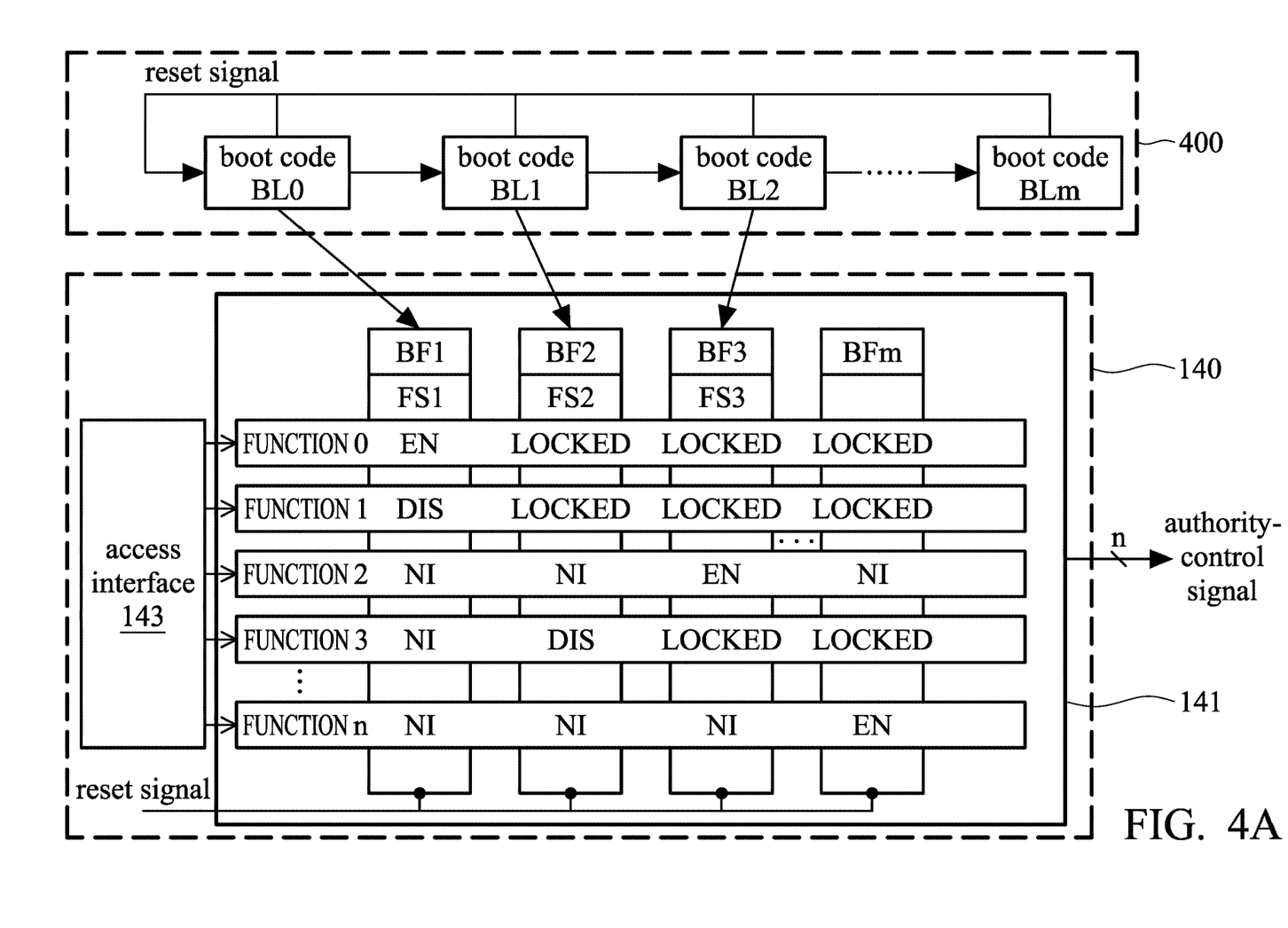
FIG. 4A is a diagram of the authority-control logic in the authority-control circuit in accordance with an embodiment of the invention.

FIG. 4A is a diagram of the authority-control logic in the authority-control circuit in accordance with an embodiment of the invention.

Referring to FIG. 2A and FIG. 4A, the software booting procedure 400 in FIG. 4A is similar to software booting procedure 200 in FIG. 2A, and the software booting procedure 400 may include m+1 boot codes such as boot codes BL0 to BLm. Each of the boot codes BL0 to BLm corresponds to a boot flag. In addition, if the peripheral apparatuses 160 of the computer apparatus 100 have n+1 functions, each of the boot codes BL0 to BLm corresponds the function sets FS0 to FSm. For example, the authority-control logic 141 can pre-define the setting values of the n+1 functions into m+1 sets, and each set corresponds to a boot flag. The default values of the functions in eat set can be predefined setting values in the authority-control circuit 140, immutable setting values, or settings values pre-stored in the non-volatile memory 132. When the computer apparatus 100 is reset, the authority-control circuit 140 can read the setting values of each set pre-stored in the non-volatile memory 132 through the access interface 143, wherein the functions of each set FS are shown in FIG. 4A.

In the embodiment, after the processing unit 110 has completed the tasks of the boot code BL0 and before the processing unit 110 jumps out the boot code BL0, the boot code BL0 will first set the setting value and lock value of each function in the function set FS1 corresponding to the boot code BL1, and then set the boot flag BF1 corresponding to the boot code BL1. After the boot flag BF1 has been set, the processing unit 110 executes the boot code BL1, and it indicates that the software booting procedure is in the status of the boot code BL1, and so on.

Specifically, when the processing unit 110 sets the boot flag BF1, it indicates that the setting value and lock value of each function of the function set FS1 are set. The setting value indicates whether the function can be used, such as the setting values of 1 and 0 respectively represent that the function is enabled (EN) and disabled (DIS). In addition, each function in FIG. 4A being labeled as "NI" may indicate that the function is not used or locked.

The lock value may indicate whether the setting value of this function can be modified again, and the setting value and lock value may be linked. If the default setting value of a specific function is 0, when the setting value of this specific function is set to 1, it can no longer be set to 0. After the lock value is set, the processing unit 110 or the authority-control circuit 140 can clear the lock value and restore the setting value to the default value only when the reset signal is triggered. The reset signal may be the POR signal when the computer apparatus 100 is powered on again, and it can be used to re-execute the software booting procedure. That is, the reset signal can be triggered to clear the hardware lock value, and the software executed by the processing unit 110 will first execute the boot code BL0 (i.e., the initial boot code).

In FIG. 4A, after the execution of the boot code BL0 ends, the processing unit 110 (or the authority-control circuit 140) will first set the setting value and/or lock value of each function corresponding to the function set FS1, and then set the boot flag BF1 corresponding to the boot code BL1. For example, before setting the boot flag BF1, the processing unit 110 (or the authority-control circuit 140) will enable the setting value of function 1 and disable the setting value of function 2 of the function set FS1, the setting values and lock values of other functions in the function set FS1 are not modified.

It should be noted that because the setting values of functions 1 and 2 in the function set FS1 have been modified at this time, the corresponding lock values will also be set to 1 (i.e., indicating being locked), and each of the boot codes BL1 to BLm subsequent to the boot code BL0 has no authority to modify the setting values of functions 1 and 2 in each corresponding function set. In the function set FS1, the setting values of functions 3 to m are not modified, and functions 3 to m will be opened to the subsequent program code for management. After the processing unit 110 has completed execution of the boot code BL1 and is about to execute the boot code BL2, the processing unit 110 (or the authority-control circuit 140) can set the setting values of related functions according to the functional requirements of the function set FS2. For example, the setting value of function 3 can be disabled. Since the setting value of function 3 is locked by the boot flag BF2, the boot codes subsequent to the boot code BL2 will no longer able to configure function 4.

In addition, in different execution states in the software booting procedure, the authority-control signal output by the authority-control circuit 140 will also change accordingly, as shown by the setting value of each function in the authority-control logic 141 in FIG. 4A. Specifically, the authority-control signal may include multiple bits, and each bit can control the function of the corresponding peripheral apparatus 160 to be turned on or off. When the setting values of some functions are not modified by the current boot code, the setting values of these functions may be the default setting values or the setting values modified by the previous boot code.

Figure 4B:
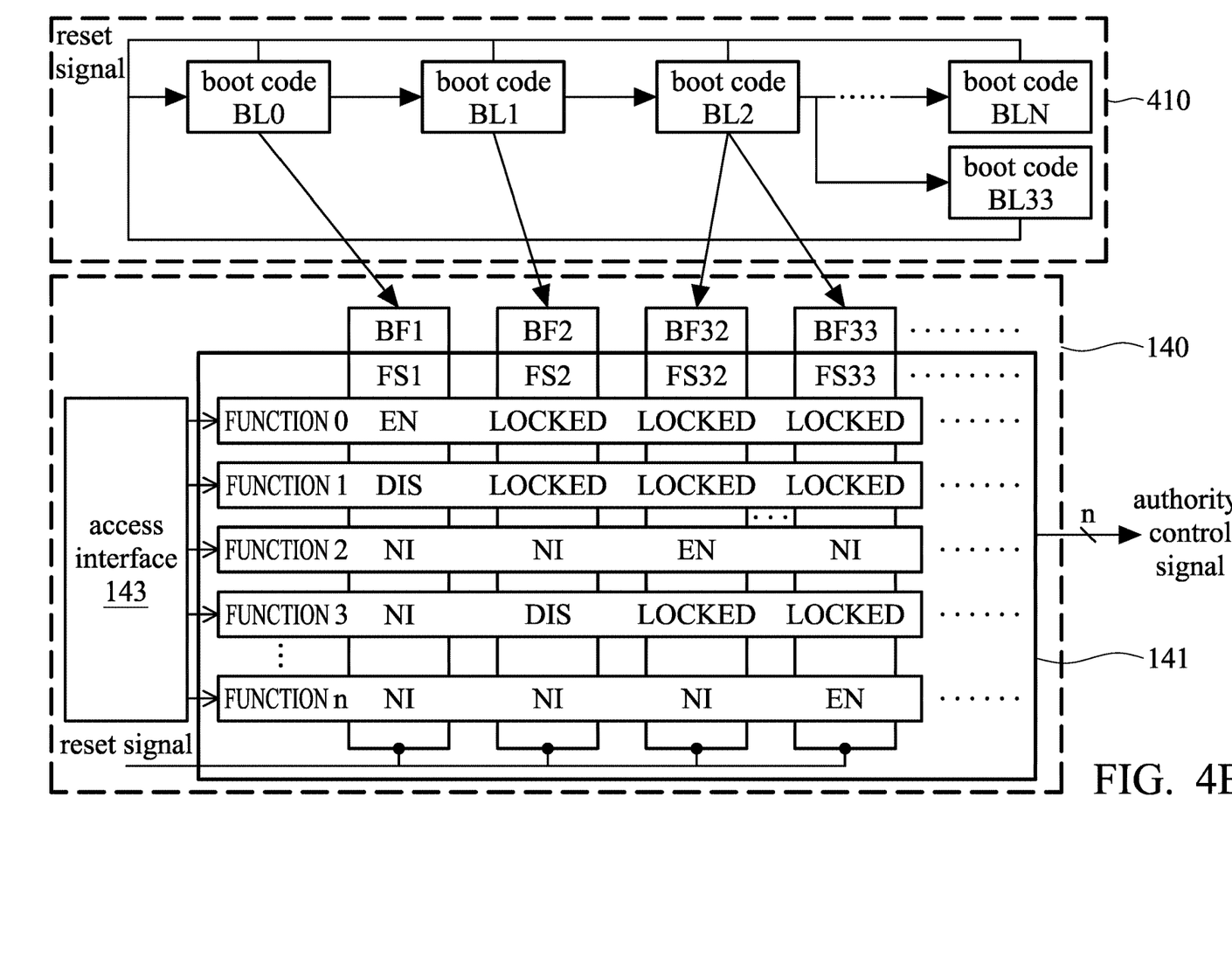
FIG. 4B is a diagram of the authority-control logic in the authority-control circuit in accordance with another embodiment of the invention.

FIG. 4B is a diagram of the authority-control logic in the authority-control circuit in accordance with another embodiment of the invention.

Referring to FIG. 2B and FIG. 4B, the software booting procedure 410 in FIG. 4B is similar to software booting procedure 210 in FIG. 2B. In the software booting procedure 410, after the execution of the boot code BL2 is completed, one of the boot flags BF3 and BF4 will be set conditionally, and the corresponding boot code BL32 or BL33 will be executed. If the boot code BL32 is executed, the software booting procedure 410 will enter a first branch from the boot code BL32 to BLm. If the boot code BL33 is executed, the software booting procedure 410 will enter a second branch from the boot code BL32 to BLmm. Similarly, each boot code corresponds to a boot flag, and each boot code has a corresponding function set. The method for setting the boot flags BF1 and BF2 is similar to that in the embodiment in FIG. 4A, and thus the details are not repeated here.

After the execution of the boot code BL2 is completed, the processing unit 110 will set the boot flag BF3 or BF4 conditionally. If the boot code BL32 is executed and the software booting procedure 410 enters the first branch, the setting values of some functions (e.g., function 3) in the function set FS32 set by the boot flag BF32 will be locked, and thus the subsequent boot codes in the first branch can only modify the setting values that have not been modified by the boot flags BF1 and BF2. If the boot code BL33 is executed and the software booting procedure 410 enters the second branch, the setting values of some functions (e.g., function n) in the function set FS33 set by the boot flag BF33 will be locked, and thus the subsequent boot codes in the second branch can only modify the setting values that have not been modified by the boot flags BF1, BF2 and BF3.

In the software booting procedure 410 in FIG. 4B, the boot flags BF32 and BF33 of the boot codes BL32 and BF33 are set by the boot code BL2, and the boot codes BL32 and BL33 have no right to activate each other, so that aforementioned design still complies with the concept of the chain of trust.

Figure 4C:
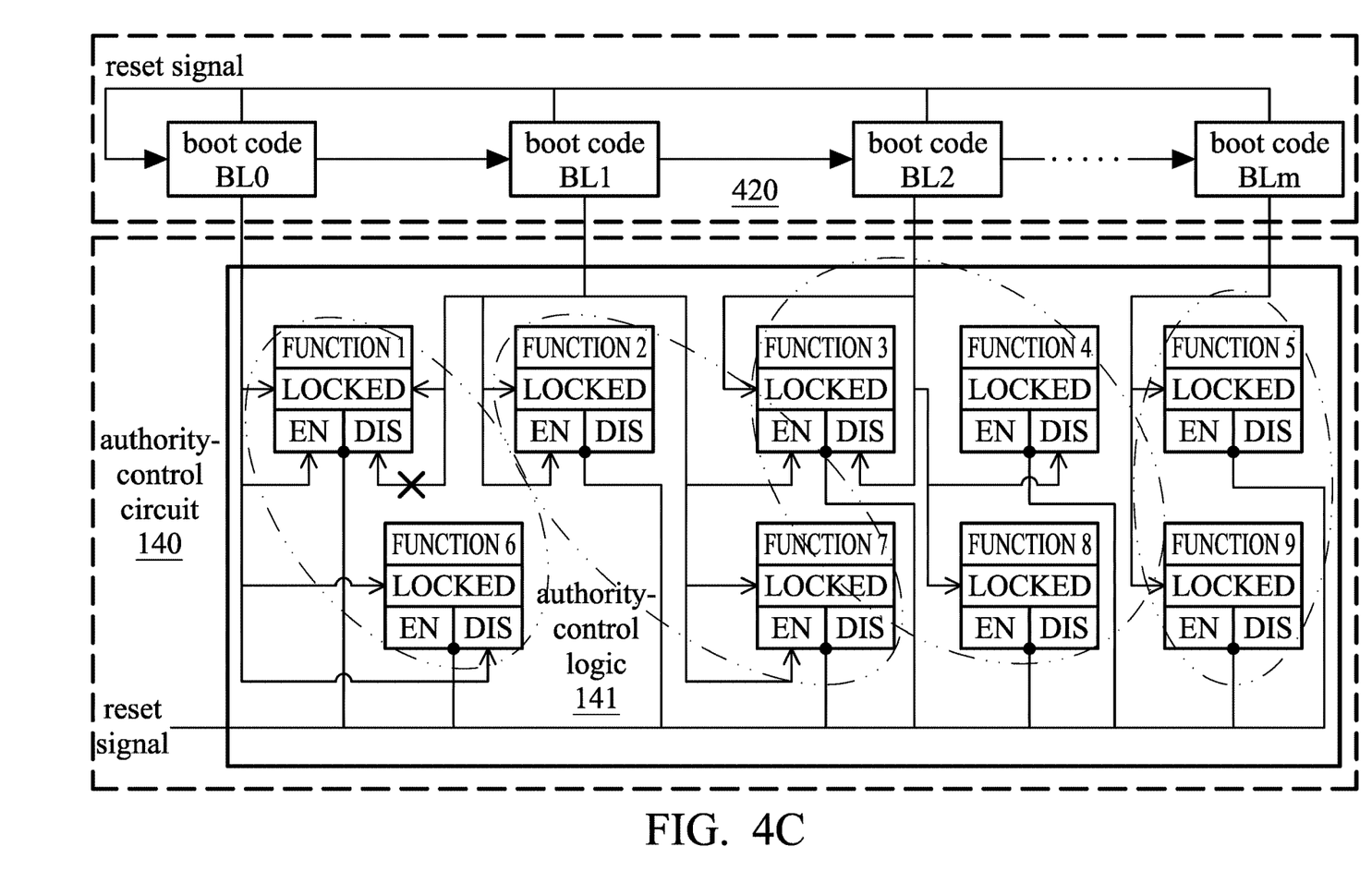
FIG. 4C is a diagram of the authority-control logic in the authority-control circuit in accordance with yet another embodiment of the invention.

FIG. 4C is a diagram of the authority-control logic in the authority-control circuit in accordance with yet another embodiment of the invention.

Referring to FIG. 2A and FIG. 4C, in the embodiment of FIG. 4C, the software booting procedure 420 in FIG. 4C is similar to the software booting procedure 200 in FIG. 2A, and the software booting procedure 420 includes m+1 boot codes such as boot codes BL0 to BLm. In addition, the default setting values of functions 1 to 9 are represented by bold texts, and there is no default setting value for function 5.

When the processing unit 110 completes execution of the boot code BL0 and sets the corresponding boot flag BF0, the authority-control circuit 140 can set the setting values and lock values of functions 1 and 6 according to the boot flag BF0. For example, the setting value of function 1 is set to an enabled state (e.g., the setting value is 1) from the default disabled state (e.g., the setting value is 0), and the setting value of function 6 is set to a disabled state (e.g., the setting value is 0) from a default enabled state (e.g., the setting value is 1). In addition, the authority-control circuit 140 can lock the setting values of functions 1 and 6 according to the boot flag BF0, and it indicates that the management authority of functions 1 and 6 belongs to the boot code BL0. When the software booting procedure proceeds the boot code BL1, because function 1 is locked, attempt to modify the setting value of function 1 by the boot code BL1 will be rejected. However, the boot code BL1 still has the authority to set the setting values of functions 2, 3, and 7. In the embodiment, when the boot code BL1 sets the setting value of function 7 to an enabled state, the setting value of function 7 is not locked. Therefore, the boot code BL1 opens the authority of managing function 7 to subsequent boot codes, such as the boot code BL2.

Afterwards, when the software booting procedure 420 proceeds to the boot code BL2, the boot code BL2 sets the setting values of functions 3 and 4, and locks the setting values of functions 3, 4, and 8. It indicates that the management authority of functions 3, 4 and 8 is only valid till the boot code BL2. Since the boot code BL2 does not set the setting value of function 8, it indicates that the setting value of function 8 will be kept at the default value and cannot be modified by subsequent boot codes. In addition, the default setting value of function 4 represents an enabled state, and the boot code BL2 sets the setting value of function 4 to an inverse setting value (i.e., the disabled state), wherein the inverse setting value is the same with the lock value, and thus the boot code BL2 can only set the setting value of function 4 without setting the lock value separately.

In addition, because the boot codes BL2 to BLm do not set setting values of functions 5 and 9, it indicates that the boot code BLm has the management authority of functions 5 and 9. As shown in FIG. 4C, the boot code BLm sets the lock values of functions 5 and 9, but does not set the setting values of functions 5 and 9. Since function 5 does not have a default setting value, in this case, the operation of setting the lock value of function 5 by the boot code BLm is invalid. That is, the setting value of function 5 should be set before the lock value of function 5 is set.

In the aforementioned embodiments, the authority-control circuit 140 can be combined with the software chain of trust, and provide a hierarchical hardware authority-management function, and various advantages can be achieved by the unified authority-control circuit 140. For example, the authority-control circuit 140 can provide a hardware boot flag to indicate a current booting state of the computer apparatus 100, so that the computer apparatus 100 can support multiple processors or multiple computing cores. When the computer apparatus 100 includes multiple computing cores, the host computing core can set the corresponding boot flag according to the currently executed boot code, and other computing cores can know the current booting state of the computer apparatus 100 according to the set boot flag being to perform corresponding operations, thereby reducing synchronous delay between multiple computing cores. In addition, the booting stage of multiple computing cores can be connected in series with this hardware boot flag.

When the design of the hardware boot flag in the aforementioned embodiment is used, it can ensure the atomicity of the authorities of all peripheral apparatuses in each stage of the software booting procedure, which means that a unified setting method can ensure the consistency of the authority of each function. For example, when the software booting procedure jumps from the boot code BL0 to the boot code BL1, the authority-control circuit 140 (or the peripheral apparatuses corresponding to the boot code BL0) can hide the storage region of the boot code BL0, and also hide the key for use by the boot code BL0. The aforementioned two operations and their effects will occur together, so it can ensure that the computer apparatus has no security loopholes.

Because the authority-control circuit 140 can provide the authority management function that is preset for various peripheral apparatuses and related hardware circuits and cannot be modified by any software, it can ensure that all preset functions can take effect and cannot by modified by any software. In addition, the default setting value of each function can be read when the computer apparatus 100 is started. For example, the authority-control circuit 140 can read the default setting values stored in the non-volatile memory 132 through the access interface 143 so as to ensure that the authority state of each stage in the software booting procedure will not be affected by the software execution state. The writing or modification of the setting values can be managed by an additional authentication mechanism such as modifying the setting values after a successful password authentication.

Figure 5:
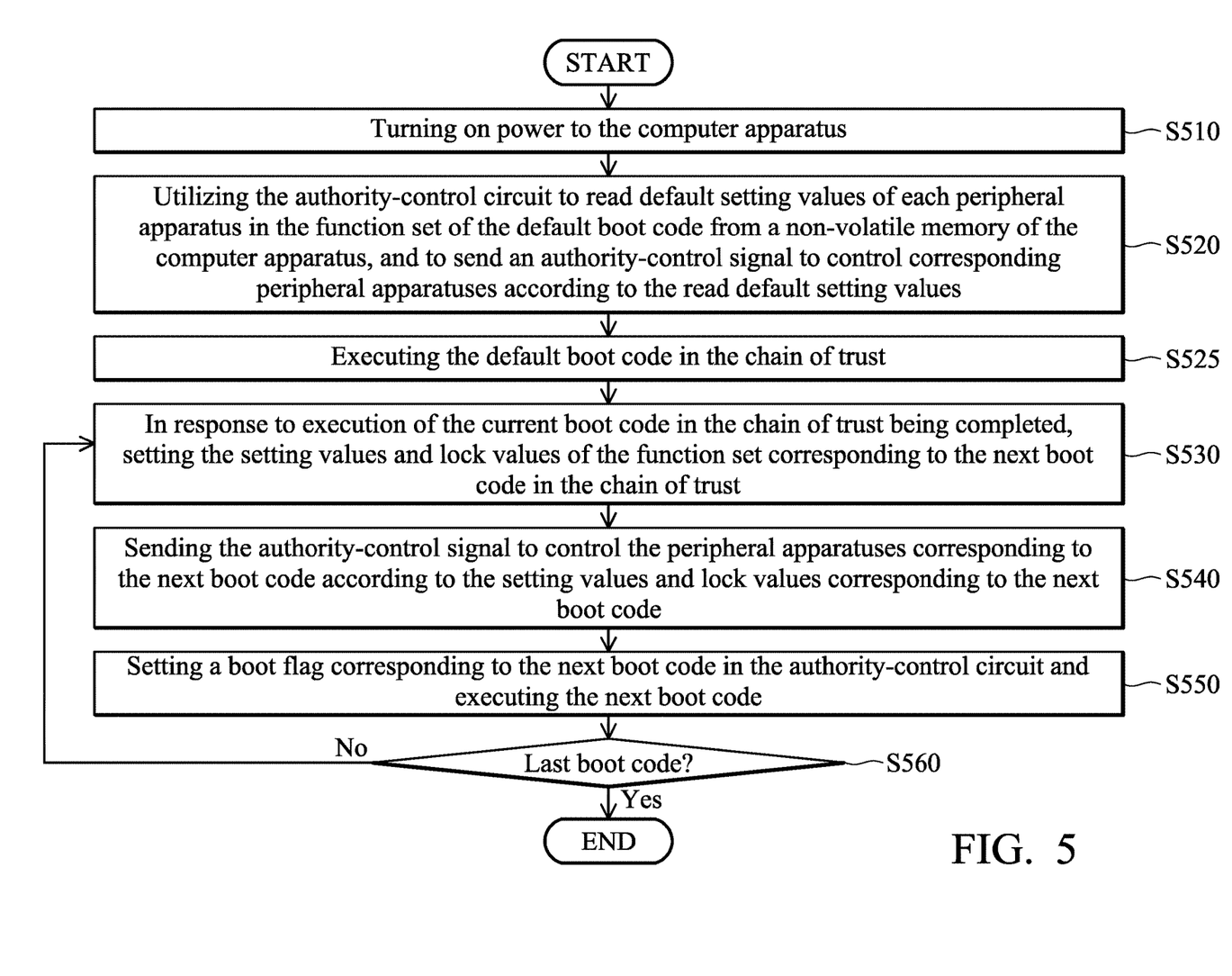
FIG. 5 is a flow chart of an authority-management method based on a chain of trust in accordance with an embodiment of the invention.

FIG. 5 is a flow chart of an authority-management method based on a chain of trust in accordance with an embodiment of the invention.

In step S510, power to the computer apparatus 100 is turned on.

In step 520, the authority-control circuit 140 is utilized to read default setting values (and/or default lock values) of each peripheral apparatus in the function set of the default boot code from a non-volatile memory of the computer apparatus 100, and to send an authority-control signal to control corresponding peripheral apparatuses according to the read default setting values.

In step S525, the processing unit 110 executes the default boot code (i.e., boot code BL0) in the chain of trust. The chain of trust may include the default boot code and subsequent one or more boot codes (e.g., boot codes BL1 to BLm). In addition, the default boot code is a boot code that must be executed by the processing unit when the computer apparatus 100 is turned on, so the default boot code does not include a corresponding boot flag.

In step S530, in response to execution of the current boot code in the chain of trust being completed, the setting values and lock values of the function set corresponding to the next boot code in the chain of trust are set. For example, the execution flow of each boot code in the chain of trust can be referred to in the embodiments of FIGS. 2A-2B and FIGS. 4A-4C.

In step S540, the authority-control signal is sent to control the peripheral apparatuses corresponding to the next boot code according to the setting values and lock values corresponding to the next boot code. For example, in different execution states of the software booting procedure, the authority-control signal output by the authority-control circuit 140 will also change accordingly, as shown in the setting value of each function in the authority-control logic 141 in FIG. 4A. Specifically, the authority-control signal may include multiple bits, and each bit can control the function of the corresponding peripheral apparatus 160 to be turned on or off. When the setting values of some functions are not modified by the current boot code, the setting values of these functions may be the default setting values or the setting values modified by the previous boot code. For example, if the current boot code has changed the setting values of some functions (i.e., the modified setting values are different from the default values), the current boot code can lock the modified setting values of these functions. If some functions do not have default setting values, the lock value is not valid until the setting values of these functions have been set. Once the setting values of some functions have been locked, the boot codes subsequent to the current boot code have no authority to modify the setting values of these functions.

In step S550, a boot flag corresponding to the next boot code in the authority-control circuit 140 is set, and the next boot code is executed. For the processing unit 110, when the boot flag of the next boot code has been set, it indicates that the state of the chain of trust executed by the software has entered the execution state of the next boot code. Accordingly, before the processing unit 110 executes the next boot code, the authority-control circuit 140 has to set the setting values and lock values of the function set corresponding to the next boot code to prevent the next boot code from controlling the peripheral apparatuses beyond the authority of the next boot code.

In step S560, it is determined whether the current boot code is the last boot code in the chain of trust. If the current boot code is the last boot code in the chain of trust, the flow ends. If the current boot code is not the last boot code in the chain of trust, step S530 is performed, and the next boot code in the chain of trust is executed. For example, the processing unit 110 can determine whether the current boot code is the last boot code in the chain of trust after the execution of the current boot code is completed.

In view of the above, a computer apparatus and an authority-management method based on a chain of trust are provided, which can use a unified hardware authority-control circuit to control the authority of the functions corresponding to each boot code in the chain of trust, thereby providing a hierarchical authority-management function. In addition, the computer apparatus and the authority-management method in the present invention can ensure the consistency of the authority and authority-management action time of all peripheral apparatuses at each stage of the software booting procedure, thereby enhancing the security of the computer apparatus.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer apparatus, comprising:
a plurality of peripheral apparatuses, having a plurality of corresponding functions;
a non-volatile memory, configured to store a plurality of boot codes and a plurality of setting values of a function set of the peripheral apparatuses corresponding to each boot code, wherein the boot codes form a chain of trust;
a processor, configured to execute one of the boot codes in the chain of trust as a current boot code, wherein the current boot code corresponds to a first function set of the peripheral apparatuses; and
an authority-control circuit, electrically connected to the processor and the peripheral apparatuses, configured to read the setting values of the function set of the peripheral apparatuses corresponding to each boot code from the non-volatile memory;
wherein in response to execution of the current boot code being completed, the authority-control circuit sets the setting values of the functions in a second function set corresponding to a next boot code in the chain of trust, sends an authority-control signal to control the peripheral apparatuses corresponding to the second function set according to the setting values of the functions in the second function set, and sets a boot flag corresponding to the next boot code in the authority-control circuit to control the processor to execute the next boot code, wherein the first function set is different from the second function set.

2. The computer apparatus as claimed in claim 1, wherein when the setting values of the functions in the second function set corresponding to the next boot code are set and locked, the next boot code and its subsequent boot codes cannot modify the setting values of the functions in the second function set.

3. The computer apparatus as claimed in claim 1, wherein when a first function among the functions does not have a default setting value, the processor sets the setting value of the first function before locking the setting value of the first function.

4. The computer apparatus as claimed in claim 3, wherein the processor comprises a plurality of computing cores, and a host computing core of the computing cores sets the boot flag corresponding to the executed current boot code, and other computing cores of the computing cores are connected in series to the boot flag.

5. The computer apparatus as claimed in claim 1, wherein when the processor switches to execute the next boot code from the current boot code, the authority-control circuit hides a storage region of the current boot code in the non-volatile memory, and hides a key corresponding to the current boot code.

6. The computer apparatus as claimed in claim 1, wherein when the authority-control circuit receives a reset signal of the computer apparatus, the authority-control circuit clears the boot flag and the setting values of each function corresponding to each boot code.

7. An authority-management method based on a chain of trust, for use in a computer apparatus, wherein the computer apparatus comprises a plurality of peripheral apparatuses and an authority-control circuit, the method comprising:
- executing one boot code in a plurality of boot codes in a chain of trust as a current boot code, wherein the current boot code corresponds to a first function set of the peripheral apparatuses;
- utilizing the authority-control circuit to read setting values of a function set of the peripheral apparatuses corresponding to each boot code from the non-volatile memory; and
- in response to execution of the current boot code being completed, utilizing the authority-control circuit to set the setting values of the functions in a second function set corresponding to a next boot code in the chain of trust, to send an authority-control signal to control the peripheral apparatuses corresponding to the second function set according to the setting values of the functions in the second function set, and to set a boot flag corresponding to the next boot code in the authority-control circuit to control the processor to execute the next boot code,
- wherein the first function set is different from the second function set.

8. The method as claimed in claim 7, when the setting values of the functions in the second function set corresponding to the next boot code are set and locked, the next boot code and its subsequent boot codes cannot modify the setting values of the functions in the second function set.

9. The method as claimed in claim 7, further comprising:
- when a first function among the functions does not have a default setting value, setting the setting value of the first function before locking the setting value of the first function.

10. The method as claimed in claim 7, wherein a processor of the computer apparatus comprises a plurality of computing cores, and a host computing core of the computing cores sets the boot flag corresponding to the executed current boot code, and other computing cores of the computing cores are connected in series to the boot flag.

11. The method as claimed in claim 7, further comprising:
- when switching to execute the next boot code from the current boot code, utilizing the authority-control circuit to hide a storage region of the current boot code in the non-volatile memory, and to hide a key corresponding to the current boot code.

12. The method as claimed in claim 7, further comprising:
- when the authority-control circuit receives a reset signal of the computer apparatus, utilizing the authority-control circuit to clear the boot flag and the setting values of each function corresponding to each boot code.

* * * * *